Sept. 2, 1958 W. WELSH 2,850,568

PULSE GENERATORS

Filed Feb. 3, 1956 2 Sheets-Sheet 1

INVENTOR
WILLIAM WELSH
BY
H.S. Hendry
ATTORNEY

Sept. 2, 1958 W. WELSH 2,850,568

PULSE GENERATORS

Filed Feb. 3, 1956 2 Sheets-Sheet 2

INVENTOR-
WILLIAM WELSH
H.S. Hendry
ATTORNEY

United States Patent Office 2,850,568

Patented Sept. 2, 1958

2,850,568

PULSE GENERATORS

William Welsh, Ottawa, Ontario, Canada

Application February 3, 1956, Serial No. 563,343

17 Claims. (Cl. 178—69.5)

This invention relates to pulse generators and more particularly to a system for generating the synchronizing signal in television broadcasting.

In accordance with adopted standards for television systems, provision must be made for the transmission of four signals: picture information, horizontal and vertical synchronizing pulses, and sound signal. The combination of the picture signal and the two synchronizing signals has been recognized as particularly suitable, but the picture signal and the synchronizing signal require different ranges of amplitude since these two classes of signals cannot be distinguished from one another by a frequency separation. Furthermore, these two classes of signals must also occupy different time intervals. These requirements are satisfied by assigning an amplitude range beyond "black" to the synchronizing signals.

Generally, the signals may be applied to an R. F. carrier, as either amplitude, phase, or frequency modulation, but the predominate practice is to use amplitude modulation. Polarity of modulation may be either positive or negative. The first alternative "positive modulation" includes at all times the synchronizing level and the "black" level. It does not indicate the level of "peak white" unless picture elements of this intensity are present in the picture. Negative modulation polarity, on the other hand, includes at all times the synchronizing level, the "black" level and "peak white." Operating conditions of automatic gain control are simplified by using the peaks of the signal envelope defining the black level in negative modulation polarity.

The synchronizing pulses inserted in the time intervals provided for scanning retrace consist of a series of precisely-formed pulses of three types: the horizontal synchronizing pulses, the vertical synchronizing pulses, and the equalizing pulses. Referring again to adopted standards, 525 horizontal synchronizing pulses are formed during two successive fields, but during the vertical blanking pulse, a group of nine horizontal synchronizing pulses is removed and six equalizing pulses, six vertical synchronizing pulses, and a second group of six equalizing pulses are transmitted in their stead. To produce the trains of pulses specified, continuous trains of each of the component pulses, that is, the horizontal synchronizing pulses, the equalizing pulses, and the vertical synchronizing pulses are formed and the required groups of pulses are selected by "keying pulses." It is with the formation of these keying pulses, or keying waves as they are often called, that my invention is chiefly concerned. To form these keying pulses it is customary at the present to employ a master oscillator in combination with counters, blocking oscillators or multivibrators and to determine the pulse duration by exponential charging of capacitors. In some applications, delay lines are used to control repetition rate and to supply simultaneously synchronizing pulses employed in the formation of the pulses at desired times in each period.

The great weakness or disadvantage of the present day systems as above explained, is that the tolerances in the shape of the pulses are very narrow and the difficulties in the generating of complex pulse trains increase with an increase in frequency. It is primarily to cure such weakness or disadvantage that I have developed the new system which constitutes my invention. Primarily, the invention resides in the formation of pulse trains derived from one master frequency only, with the leading and the trailing edge of the low frequency pulse determined by corresponding pulses of the master frequency and therefore much more precisely defined than those produced by the present systems.

Another advantage of this invention is the independence of the pulse shape from variation of components used in delay circuits due to change in temperature or aging.

Still another advantage is the feasibility of changing the frequency of the pulse trains without influencing the shape of the individual pulses, by variation of the master frequency only.

For a better understanding of the method and means by which the new principle may be practised, reference may be had to the following detailed description to be read in connection with the accompanying drawings in which.

Figure 1:
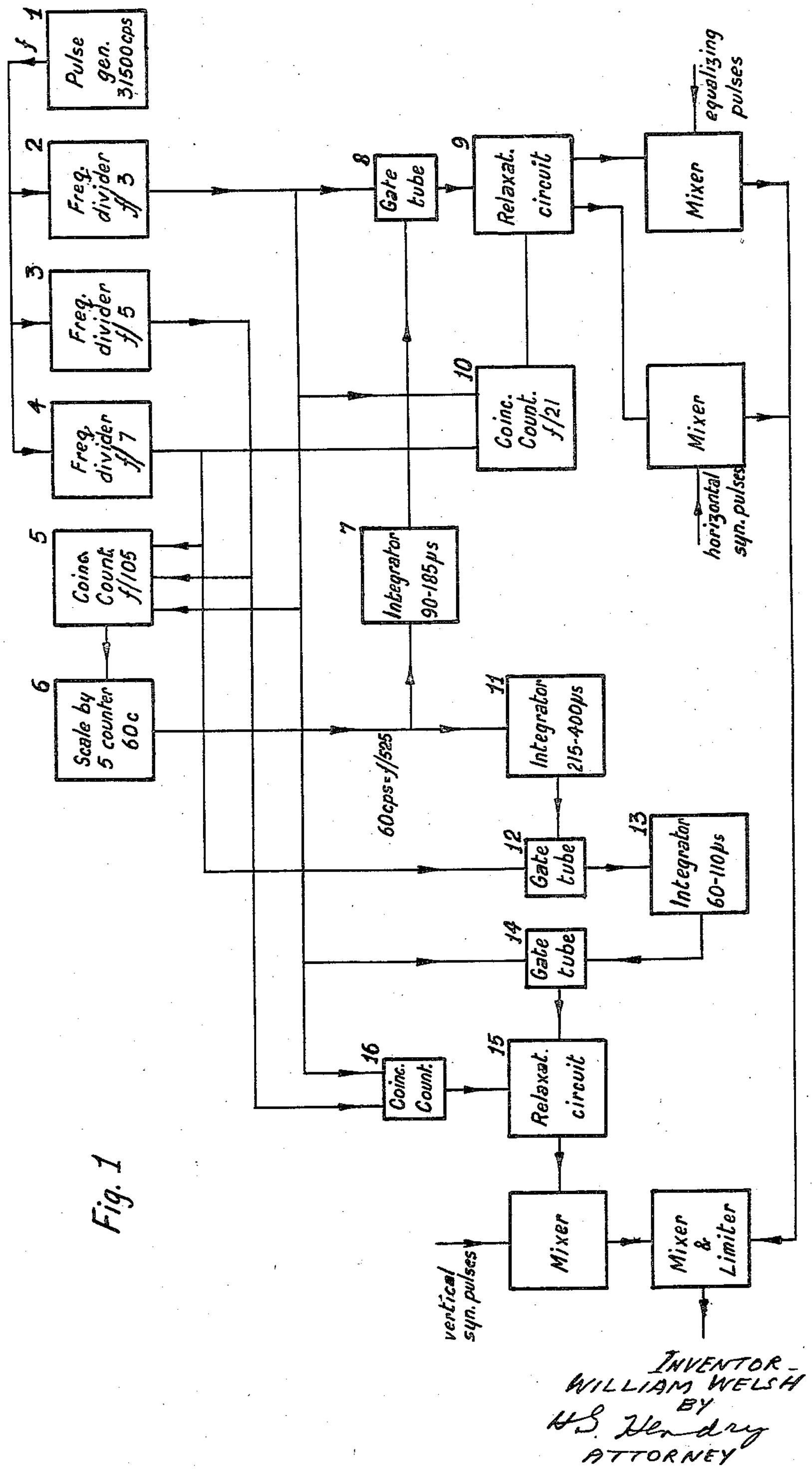
Figure 1 is a block diagram of a pulse generating system in accordance with my invention.

In describing the embodiment of the invention shown in the drawing, and by way of examples, standardized wave shapes and sequences will be used for the purpose of better illustrating the invention. It will be understood, however, that my invention is in no way limited in its application to the particular application, repetition rate, pulse shapes and timing chosen by way of illustration.

In Figure 1 is shown a pulse generator 1 producing pulses with a frequency of 31,500 C. P. S. The pulse generator may be of any type and its interior function is without influence on the principle involved. The output of this generator 1 is led to three frequency dividers. The first one, 2, operates at one-third the frequency of the generator or 10,500 C. P. S. The second one, 3, divides the master frequency by five, producing one-fifth the frequency of the generator or 6300 C. P. S. The last one, 4, produces a frequency of one-seventh the frequency of the generator or 4500 C. P. S.

These individual subharmonic frequencies are applied to a coincidence frequency divider 5 such as described in the book entitled "Waveforms," at pages 625 and 626 (this book is vol. 19 of the Massachusetts Institute of Technology Radiation Laboratory Series, published by McGraw-Hill Book Co., New York city, 1949), to obtain a frequency division by 105, or 300 C. P. S., but any other system of frequency dividers, i. e. of the cascade or counting type, can be employed for the same purpose.

Feeding the 105th subharmonic to a scale-of-five counter or frequency-divider 6 will select a frequency of $\frac{1}{525}$ that of the generator, equal to 60 C. P. S. Such a frequency, 60 C. P. S., is that of the particular application, explaining the principle of the invention. This frequency corresponds to the field frequency used in commercial television broadcasting.

Figure 2:
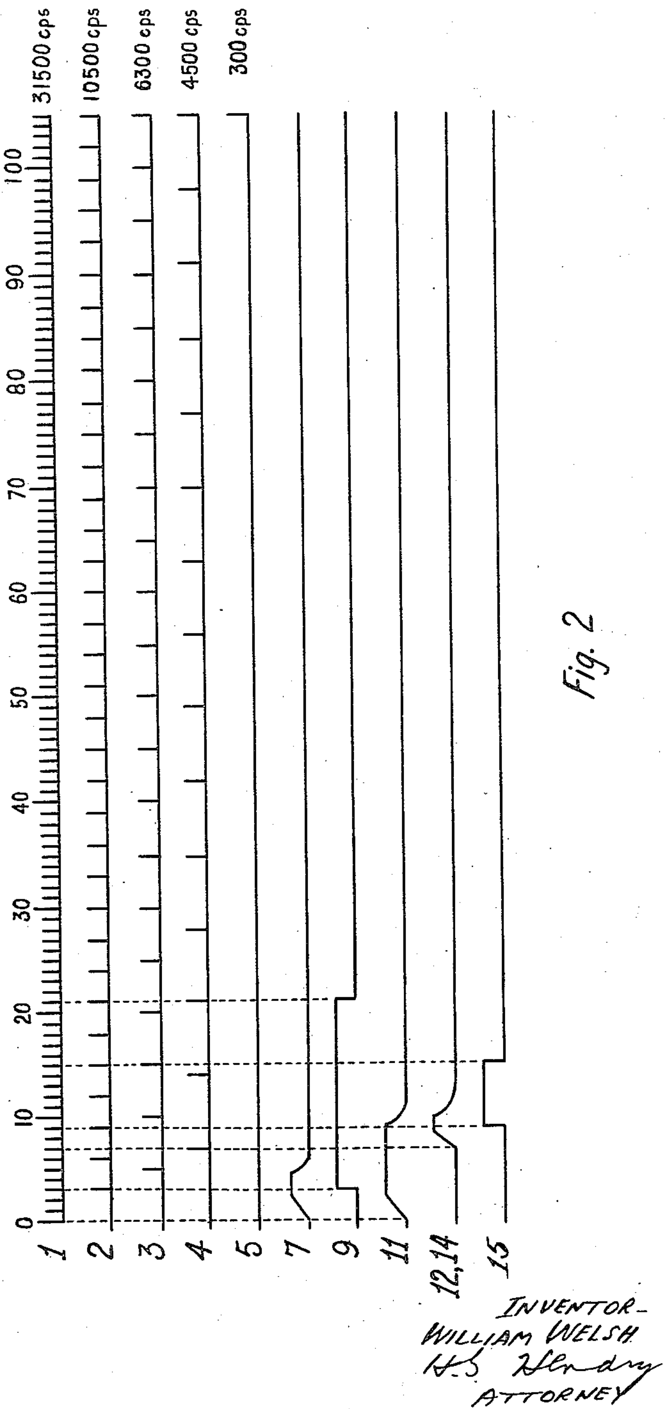
Figure 2 is a graphical illustration showing the steps of the method.

In conformity with the present practice, one train of 18 pulses of different widths has to be provided once during one cycle of the above mentioned field frequency. Figure 2 shows graphically the pulses in the different stages of the system, being designated by the same numerals as are used for the individual parts. To introduce an order, any elapsed time may be counted either in pulse intervals of the master frequency 31,500 C. P. S. or in microseconds, counting from the pulse which occurs exactly in time with the output pulse of the 60 C. P. S. counter 6; further reference will be made to this pulse as the "zero pulse" and a corresponding designation is used on the scale for the frequency of generator 1.

Integrating the zero pulse in a pulse widener 7 to a length between 90 and 185 microseconds to control a gating tube 8 simultaneously with a frequency $f/3$ will result in the selection of the third pulse only, which is applied to a relaxation circuit 9 with two permanently stable conditions ("flip-flop circuit"). Triggering one tube to cut off due to the third pulse, the circuit will remain in this condition until a restoring pulse is applied. According to the task chosen for demonstration of the principle only, a time interval of 18 pulses is required. To obtain the restoring pulse a coincidence counter 10 is operated at the frequencies $f/3$ and $f/7$ selecting the twenty-first pulse to reset the relaxation circuit 9 again. In the diagram Figure 2 the wave 9 obtained is indicated to be used for keying in the 18 pulses during the vertical blanking interval. A similar wave of opposite polarity is also generated in the "flip-flop" circuit 9 and is used to "key out" 9 horizontal synchronizing pulses. Six vertical synchronizing pulses of the same pulse repetition rate as the equalizing pulses, but of greater width, are required to be added to the centre six equalizing pulses. They keying wave for selecting these six pulses is formed as follows:

Applying the zero pulse to another pulse widener 11 to integrate into a pulse between 215 and 400 microseconds and controlling a gating tube 12 simultaneously with the seventh subharmonic will select the seventh pulse only, which is integrated and widened to a length between 60 and 110 microseconds in the integrating system 13. Simultaneous control of the gating tube 14 by this widened pulse and the frequency $f/3$ will select the ninth pulse only, which will trigger a relaxation circuit 15 similar to the type mentioned under 9. Because duration of this keying wave is limited to six pulses according to adopted standards, the required fifteenth pulse is obtained by means of a coincidence counter 16 from the third and fifth subharmonics.

As demonstrated in this particular application, the relations between the master frequency and the derived pulse or pulses of lower frequency are determined by precise numerical relations, defining accurately the leading and the trailing edge of the pulses obtained. As far as integrators for widening of pulses are employed, the width of the widened pulse is subect to tolerances of about 100 percent and therefore in practice independent of variation of the electrical data of the components used. While I have disclosed a specific principle for producing pulses in numerically defined relation to only one master frequency, it will be understood that the form herein illustrated and described is given by way of example only and not to limit the objects of the invention and the appended claims.

The embodiments of the invention in which an exclusive property or privilege is claimed are defined as follows:

1. Apparatus for initiating a wave at a predetermined time following a reference time comprising a generator of a master train of pulses, a plurality of divided frequency pulse selectors fed with said master pulses to produce respective trains of selected pulses whose recurrence periods are integral multiples of the master pulse period, a coincidence counter fed with pulses from all of said selectors to produce a reference timing pulse for each predetermined number of coincidences of all selected pulse trains, a gate, means feeding pulses from one of said selectors to said gate, means feeding a reference timing pulse to open said gate for an interval coextensive with the occurrence of a pulse from the said selector, a wave generator, and means feeding a pulse passed by the gate to the wave generator to initiate a wave.

2. Apparatus as in claim 1 wherein the gate is opened for a duration to pass solely that pulse of the applied divided frequency train which next follows the reference timing pulse.

3. Apparatus for initiating a wave at a predetermined time following a reference time comprising a generator of a master train of pulses, a plurality of divided frequency pulse selectors fed with master pulses to produce respective trains of selected pulses having recurrence periods which are integral multiples of the master pulse period, a coincidence counter fed with selected pulses from all said selectors to produce a reference pulse for each predetermined number of coincidences of all selected pulse trains, a first gate, means feeding pulses from one of said selectors to said gate, means applying said reference pulse to open said first gate for an interval coextensive with the occurrence of a pulse in the selected train fed to said first gate, a second gate, means feeding a certain one of said trains of selected pulses to said second gate, means feeding a pulse passed by the first gate to open said second gate for an interval coextensive with the occurrence of a pulse of said certain train, a wave generator, and means applying a pulse passed by the second gate to the wave generator to initiate a wave.

4. Apparatus as in claim 3 wherein the opening of said first gates is controlled to pass solely that pulse of the applied selected pulse train which next follows the reference pulse.

5. Apparatus for generating a wave comprising a master pulse generator, a plurality of dividers individually fed by the output of said master pulse generator for producing respective trains of slave pulses recurring at intervals that are different integral multiples of the recurrence interval of said master pulses, a coincidence circuit fed with all said slave pulses for deriving a pulse output for each coincidence of all of said trains, a counter fed from the output of said cincidence circuit and effective to produce an output pulse after a predetermined number of input pulses, a gate, means applying the output of the counter to control the opening of the gate for a predetermined time interval, means applying one of said slave pulse trains to said gate for selection of one pulse of said train occurring in said interval, a waveform generator responsive to the output of said gate and triggered by said one pulse to initiate a wave, a second coincidence circuit responsive to the coincidence of pulses from certain ones of said slave pulse trains effective to produce a control pulse, means applying the control pulse to the waveform generator to terminate the wave, and means delivering the wave as output.

6. A generator of keying waves particularly for a television transmitting system comprising a generator of a train of master pulses of recurrence frequency, $f$ which is twice the line recurrence frequency, a plurality of dividers fed with said master pulses and respectively having pulse outputs whose recurrence frequencies are $f/n_1$, $f/n_2$ and $f/n_3$ where $n_1$, $n_2$, $n_3$ are whole integers, a coincidence counter fed with all said divider outputs and effective to produce a reference pulse for each predetermined number of coincidences of all said divider output trains, a gate fed with pulses of $f/n_1$ recurrence frequency whose opening is controlled in response to applied counter output pulses whereby to produce a gate output pulse at the end of an interval $n_1$ master pulse periods long following the reference pulse, a first keying wave generator controlled by said gate output pulse to initiate a first keying wave, a switch fed by input pulses of $f/n_1$ and $f/n_3$ recurrence frequencies and responsive to coincidence of said input pulses to produce a control pulse, and means applying the control pulse to terminate said first keying wave ($n_1n_3$) master pulse periods after the reference pulse.

7. The generator of claim 6, including a second keying wave generator, a second gate circuit responsive to applied counter output pulses and opening for a minimum duration sufficient to include the next following pulse of the $f/n_3$ recurrence frequency train, a third gate responsive to and fed by the output of said second gate and opening for a duration sufficient to include the next following pulse of the $f/n_1$ train, means applying said $f/n_1$ recurrence frequency pulses to said third gate, means applying an output pulse from said third gate to a control initiation of a second keying wave commencing $(n_1)^2$ master pulse periods after the reference pulse, a second keying wave generator, a second coincidence circuit fed with pulses of $f/n_1$ and $f/n_2$ recurrence frequency pulse trains and effective to produce a control pulse, and means applying said control pulse to said second keying waveform generator to terminate said second keying wave ($n_1n_2$) master pulse periods after the reference pulse.

8. Apparatus comprising a master pulse generator, a plurality of dividers individually fed by the output of said master pulse generator for producing respective trains of slave pulses recurring at intervals that are different integral multiples of the recurrence interval of said master pulses, a coincidence circuit fed with all said slave pulses and effective to produce a coincidence pulse for each coincidence of all of said trains, a counter fed from the output of said coincidence circuit and effective to produce an output pulse for each predetermined number of input pulses, a gate controlled to open under control of the pulse output of said counter, means applying one of said slave pulse trains to said gate for selection of one pulse therefrom, a waveform generator responsive to the output of said gate and triggered by said one pulse to initiate a wave, a second coincidence circuit responsive to the coincidence of pulses from certain ones of said slave pulse trains applied thereto and effective to produce a control pulse for each coincidence, means applying the control pulse to the waveform generator to terminate the wave, and means delivering the wave as output.

9. In combination, a master pulse generator for producing a train of pulses, a plurality of divided frequency pulse generators fed from the master generator producing a respective plurality of trains of divided frequency pulses having recurrence intervals which are whole integer multiples of the master pulse recurrence interval, a coincidence counter fed by said divided frequency pulses producing a reference pulse in response to a predetermined number of coincidences of all said input trains, a keying wave generator, a gate controlled to open in response to an applied reference pulse for a minimum time interval sufficient to include the occurrence of a next following pulse of one of said divided frequency trains, means applying said one of said divided frequency trains as input to said gate, means applying a gated output pulse as control to said wave generator to initiate a wave, a coincidence pulse generator fed by pulses of certain ones of said divided pulse trains and responsive to coincidence of pulses to produce a control pulse, means applying said control pulse to said wave generator to terminate the wave, and means delivering the wave as output.

10. Apparatus for generating a frame synchronizing waveform for television transmitting systems comprising a master pulse generator producing a train of pulses at twice line frequency, a plurality of divided frequency pulse generators for producing trains of divided frequency pulses from said master pulses, a frame reference pulse generator including a coincidence counter fed with said divided frequency pulse trains, a gating means, means feeding reference pulses to open said gating means for a time interval extending sufficiently to include the occurrence of the next following pulse of one of said divided frequency pulse trains, a waveform generator, means feeding said one of said divided frequency pulse trains to said gating means, means feeding the selected pulse passed by the gate to trigger the waveform generator to initiate a wave, a coincidence pulse generator, means feeding a pair of said divided frequency pulse trains to said coincidence pulse generator to produce a control pulse upon coincidence of input pulses of said trains, and means feeding the control pulse to cut off the waveform generator and to terminate the wave.

11. Apparatus as in claim 10 further including a second gate, means feeding the selected pulse to open said second gate for a time interval extending sufficiently to include the occurrence of the next following pulse of another of said divided frequency pulse trains, a second keying waveform generator, means feeding said another of said divided frequency pulse trains to said second gate, means feeding the pulse selected by said second gate to trigger the second waveform generator to initiate a second wave, a second coincidence pulse generator, means feeding a pair of said divided frequency pulse trains to said second coincidence pulse generator to produce a second control pulse upon coincidence of input pulses of said trains, and means feeding the second control pulse to cut off the second waveform generator and to terminate the second wave.

12. Apparatus for generating a television master keying wave comprising a generator of a train of master pulses recurring at twice line frequency, a plurality of dividers fed by the master pulses to provide respective subharmonic trains of pulses selected from the master pulses to have repetition rates fractionally related to the master pulse repetition rate, a coincidence counter fed by all said selected pulses and producing a train of reference pulses recurring at frame repetition rate wherein each reference pulse occurs after a predetermined number of coincidences of pulses of all said subharmonic pulse trains, a gate circuit, means applying a reference pulse to open the gate circuit for a time interval concurrent at least with the initiation instant of a pulse of one of said subharmonic trains next following the reference pulse, means applying said one of said subharmonic trains as input to said gate, a keying waveform generator, and means applying the gate output pulse as control for said waveform generator to initiate a wave.

13. Apparatus as in claim 12 further including a coincidence pulse generator fed with a pair of subharmonic trains as inputs and responsive to coincidence of pulses of said pair of trains to produce a control pulse, means applying said control pulse to said waveform generator to terminate said wave, and means delivering the wave as output.

14. Apparatus for generating a keying waveform particularly for television transmitting systems, comprising a source of master pulses of predetermined period, a plurality of frequency divider circuits fed in parallel from said source to provide a respective plurality of trains of pulses having different periods which are integral multiples of said predetermined period, a coincidence circuit fed by the outputs of each of said dividers, a counter, means feeding the counter from said coincidence circuit to produce a reference pulse in response to a predetermined number of coincidences of all said divider outputs, a first gate fed by pulses from one of said dividers, means for feeding a reference pulse to open said gate for a time interval within whose duration the next following pulse from said one of the dividers occurs, a keying waveform generator, means applying the selected pulse output from said gate as control for said waveform generator to initiate a keying wave, a second coincidence circuit, means applying output pulses of certain of said dividers to said second coincidence circuit, and means feeding an output pulse from said coincidence circuit generated by the next occurring coincidence of pulses from said dividers for controlling the termination of the keying waveform.

15. Apparatus as in claim 14 wherein the master pulses recur at a frequency twice the line recurrence frequency, the dividers produce pulse trains having pulse periods respectively three, five, and seven times the master pulse period, and the counter operates in the scale of five.

16. Apparatus as in claim 14 wherein the keying wave is triggered by a pulse of recurrence frequency one-third the master frequency and is terminated by a coincidence of pulses of one-third and one-seventh master pulse recurrence frequencies.

17. A generator of a synchronizing signal including line and frame synchronizing pulses particularly for a television transmitting system comprising a master pulse train generator, a plurality of subharmonic pulse train generators fed with master pulses and producing trains of output pulses whose recurrence intervals are integral multiples of the recurrence interval of said master pulses, a coincidence pulse generator fed with pulses of all said subharmonic trains and responsive thereto to each coincidence of all said subharmonic trains to produce an output pulse, a counter fed by said coincidence circuit effective to produce a reference pulse for each predetermined number of coincidences, a gate circuit, means applying the reference pulse to open said gate for a minimum time interval extending concurrently with the instant at which the next following pulse of one of said subharmonic pulse trains occurs, a first keying waveform generator, means applying said one of said subharmonic trains to said gate for pulse selection thereby, means applying the pulse passed by the gate to trigger said waveform generator, a coincidence pulse generator, means applying pulses of certain subharmonic trains thereto as inputs to produce a control pulse, means applying said control pulse to said generator to terminate said waveform, a source of equalizing pulses and a source of horizontal synchronizing pulses, switch means under control of said keying waveform to pass equalizing pulses to said signal generator during the interval of said waveform and to pass said horizontal synchronizing pulses at times other than during said interval, a second gate, means applying the reference pulse to control the opening of said second gate for a time interval whose duration is concurrent with the occurrence of a predetermined one of the pulses of one of said subharmonic trains, means applying said one of said subharmonic trains to said second gate, a third gate controlled to open in response to the second gate output pulse and opening for an interval extending concurrently with the occurrence of a pulse of another subharmonic train, means applying pulses of said another train to said third gate, a second keying waveform generator, means applying the output of said third gate as control to said second waveform generator to initiate a second keying wave, a second coincidence pulse generator responsive to coincidence of applied subharmonic pulse train pulses to terminate said second keying wave, a source of vertical synchronizing pulses, means under control of said second keying waveform to pass said vertical synchronizing pulses to said signal generator during the interval of said second keying waveform, means combining the delivered pulses as a complete synchronizing signal, and means supplying said complete signal as an output.

References Cited in the file of this patent

UNITED STATES PATENTS

| | | |
|---|---|---|
| 2,105,870 | Vance | Jan. 18, 1938 |
| 2,145,332 | Bedford | Jan. 31, 1939 |
| 2,284,714 | Bedford | June 2, 1942 |
| 2,466,044 | Schoenfeld | Apr. 5, 1949 |
| 2,693,531 | Cope et al. | Nov. 2, 1954 |
| 2,705,285 | Holland et al. | Mar. 29, 1955 |
| 2,766,379 | Pugsley | Oct. 9, 1956 |